A. STANSFIELD.
PROCESS OF REDUCING ORES.
APPLICATION FILED APR. 27, 1920.
1,403,576.
Patented Jan. 17, 1922.
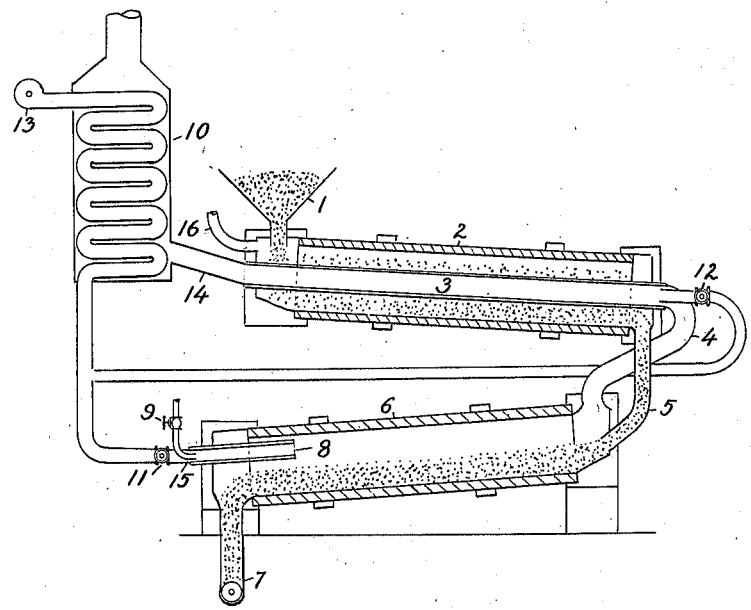
Inventor
Alfred Stansfield
By
Attorney

UNITED STATES PATENT OFFICE.

ALFRED STANSFIELD, OF MONTREAL, QUEBEC, CANADA.

PROCESS OF REDUCING ORES.

1,403,576.  Specification of Letters Patent.  Patented Jan. 17, 1922.

Application filed April 27, 1920. Serial No. 377,098.

*To all whom it may concern:*

Be it known that I, ALFRED STANSFIELD, a subject of the King of Great Britain and Ireland, residing at Montreal, in the Province of Quebec, Dominion of Canada, have invented new and useful Improvements in the Process of Reducing Ores, of which the following is a specification.

This invention relates to the reduction of oxidized ores to the metallic state without fusion and more particularly to the treatment of iron ores by a process in which the ore is mixed with carbonaceous material in suitable proportions.

The object of my invention is to provide a method for the conversion of the ore into a condition suitable for smelting in an electric furnace.

A further object is to provide a method that can be carried on in plants of comparatively small units and thus avoid the heavy capital expense and other disadvantages of a blast furnace plant.

A further object is to provide a method that will be simple in operation, rapid, economical as to fuel and maintenance, and that will reduce heat losses to a minimum.

Attempts have been made to attain these results by the direct action of heated reducing gases on the ore alone. This process required a very large amount of reducing gases and was therefore expensive.

By another process the ore mixed with carbonaceous material was treated in a furnace having a flame flue, whereby the mixture was heated without exposing it to the flame or the products of combustion directly.

The objection to this process was the difficulty of maintaining the flue walls where high temperatures were employed such as is required for the reduction of magnetite.

The invention consists in the process of passing a mixture of ore and carbonaceous material first through a muffle furnace with a separate fire-tube in which the temperature increases up to 700° C. or 800° C. and secondly through a single tube refractory-lined rotating furnace wherein it is heated to a higher temperature by fuel burnt with a limited amount of air so that the products of combustion will not reoxidize the reduced metal or burn the carbon to any serious extent.

The preferred form of furnace for the first treatment may be any suitable mechanically operated muffle furnace as for example a rotating refractory-lined tube furnace having a central flame flue. This furnace is heated by burning the combustible gases given off from the second furnace, with preheated air.

The second furnace is preferably of the single tube type, refractory-lined, and rotating.

This furnace is set at a slight incline and the heated partially reduced mixture enters it at the upper end and passes to an outlet at the lower end.

A combustion tube or chamber extends into the upper portion of the lower end of this furnace from outside the furnace end. The fuel such as oil or powdered coal is burnt in one or more burners in the outer end of the combustion tube with a controlled supply of preheated air. The gases leaving the second furnace pass into the combustion chamber of the first furnace and from thence pass into an air preheater.

In order to show the means employed more clearly reference is made to the annexed drawing, which takes the form of a diagram.

In this 1 is a hopper feeding the mixture into the upper stationary end of the furnace 2 from whence it passes down to the outlet 5 which feeds the furnace 6, and thence to the outlet 7.

The fire tube 3 of the furnace 2 is fed by the gas flue 4 and the air inlet 12 and the flue 14, carries the waste gases to the preheater 10. In the lower end wall of the furnace 6 a combustion tube 8 is secured and projects a short distance into the upper half of the rotating drum.

The fuel feed 9 and air feed 11, supply the burner 15.

Air is forced through the preheater by a fan 13 to the inlets 11 and 12 where it is under valve control.

In this process the mixture entering the first furnace is heated without being exposed to the direct flame or the products of complete combustion which would tend to reoxidize the reduced metal or the carbon. It is partially reduced to the form of sponge before it passes into the second furnace.

In the second furnace the fuel is burnt with a limited amount of air so that the products of this combustion will have a sufficient proportion of CO present to prevent reoxidation of the already reduced metal, or combustion of the carbon still in the mixture.

The combustion of fuel with a limited air supply generates, of course, less heat than if perfect combustion were effected, and the gaseous products thereof are at a lower temperature, but when the air supply is strongly preheated (and when practicable the fuel also is preheated) the products of combustion will be hot enough for the reduction of the ore, even in the case of magnetite which requires a temperature of over 900° C. for its reduction.

Furthermore the transfer of heat is more nearly perfect where it is direct and there is no separating wall, such as in the first furnace.

The gases which pass off from the second furnace being combustible can be burnt in the first furnace with a supply of preheated air and the products of this combustion pass into the air preheater, where they give up a large amount of their heat before reaching the stack.

The gases from the muffle may be used to assist in preheating the air or to dry or preheat the mixture.

In the second furnace a combustion flue or chamber of refractory material is necessary in order to ensure the required combustion and to prevent any air coming in contact with the heated mixture.

The combustion flue is so arranged that the products of combustion therefrom impinge on the refractory lining of the rotating furnace, and not directly on the surface of the charge.

I prefer the charge to fill approximately the lower half of the rotating tube.

The heating of the ore mixture is thus effected partly by conduction and radiation from the heated gases which issue from the combustion tube, partly by radiation from the heated upper part of the refractory lining and partly by conduction from that part of the heated lining which has passed under the charge.

The rotation of the furnace serves continually to keep fresh material exposed to the action of the heat and therefore to maintain a sufficiently uniform temperature throughout the depth of the charge, and also assists in passing the ore on to the outlet.

The reduced metal is fed directly to an electric furnace or may be suitably stored for further treatment.

The plant required for carrying out this process can be erected in units of comparatively small size, which can be transported with facility.

It can be started rapidly and repairs can be made without difficulty or delay.

By suitable adjustment of the length of the furnaces a very rapid rate of treatment may be obtained.

Having described my invention, what I claim is:

1. The process of reducing ores to the metallic state without fusion consisting in mixing the pulverized ore with carbonaceous material, partially reducing the mixture first in a muffle furnace at a temperature not exceeding 800° C. and then completing the reduction in a furnace without a muffle, in which a reducing or non-oxidizing flame is maintained at a higher temperature, the gases from the second furnace supplying the heat to the flame tube of the muffle furnace.

2. The process of reducing ores to the metallic state without fusion consisting in mixing the pulverized ore with carbonaceous material, heating the mixture first in a muffle furnace and then in a furnace without a muffle in which a reducing or non-oxidizing flame is maintained, the gases from the second furnace being burnt in a flame flue of the muffle furnace.

3. The process of reducing ores to the metallic state without fusion consisting in mixing the pulverized ore with carbonaceous material, heating the mixture first in a muffle furnace and then in a furnace without a muffle in which a reducing or non-oxidizing flame is maintained in a combustion tube with a minimum addition of air, the gases from the second furnace being burnt in the flame flue of the muffle furnace with preheated air.

4. The process of reducing ores to the metallic state without fusion consisting in mixing the pulverized ore with carbonaceous material, partially reducing the mixture first in a rotating muffle furnace heated to temperatures increasing to 800° C. and then completing the reduction in a rotating furnace without a muffle in which a reducing or non-oxidizing flame is maintained at a higher temperature, and using the gases from the second furnace to heat the flame tube of the muffle furnace.

5. The process of reducing ores to the metallic state without fusion consisting in mixing the pulverized ore with carbonaceous material, partially reducing the mixture first in a muffle furnace heated to a temperature not exceeding 800° C. and passing the partially reduced mixture through a furnace without a muffle, heated to a higher temperature by a reducing atmosphere, and feeding the gases therefrom into the flame tube of the muffle furnace and supplying preheated air to effect their combustion.

6. The process of reducing ores in which the ore, suitably comminuted, is mixed with a suitable amount of powdered carbonaceous material, is fed into a rotating muffle furnace, and passes through zones of increasing temperature up to 700° or 800° C., the mixture then passes into a single tube rotating furnace and is further reduced at a higher temperature by the products of combustion from one or more burners in a combustion tube projecting into the furnace, the preheated air supply to such burners being insufficient to produce complete combustion and burning the gases therefrom with added preheated air in the flame tube of the muffle furnace.

7. The process of reducing ore in which the ore and carbonaceous material are dried and comminuted, are then passed through a rotating muffle furnace and thence into a single tube rotating furnace heated from a combustion tube the burner of which has a supply of preheated air insufficient to produce complete combustion. The waste gases of the single tube furnace being fed with additional preheated air into the fire tube of the muffle furnace, the waste gases from the fire tube passing into an air preheater as described.

8. The process of reducing ores without fusion in which the ore mixed with a suitable proportion of carbonaceous material is subjected in a rotating refractory-lined furnace to the heat of reducing gases, produced by incomplete combustion in a combustion tube, whereby the entrance of air is prevented.

9. The process of reducing ores without fusion in which the ore mixed with carbonaceous material is fed into a rotating refractory-lined furnace and there heated directly by the reducing gases produced in a combustion tube adapted to exclude the entrance of air, and by the heat absorbed by the refractory lining.

10. The process of reducing ores without fusion in which the ore mixed with carbonaceous material is preheated and fed into a rotating refractory-lined furnace and there heated to a temperature of 900° C. by reducing gases produced by the incomplete combustion of fuel and a minimum of preheated air in a combustion tube projecting into the furnace.

11. The process of reducing ores without fusion in which a powdered mixture of ore and carbonaceous material is preheated and fed into a rotating refractory-lined cylindrical furnace at its cooler end and in passing to the outlet is subjected to the heat of reducing gases produced by burning fuel and a minimum of air in a burner at the outer end of a refractory combustion tube which projects into the upper portion of the outlet end of the furnace, and is adapted to heat the refractory lining of the furnace which on rotation heats the bottom of the mixture.

12. The process of reducing ores without fusion in which a powdered mixture of ore and carbonaceous material is preheated and fed into a rotating refractory lined furnace to a depth of about half the diameter of the chamber and is there heated by reducing gases which are produced by burning a preheated fuel with a minimum of preheated air in the burner at the outer end of a refractory combustion tube which projects into the upper portion of the outlet end of the furnace above the surface of the material, adapted to heat the refractory lining of the furnace to a high temperature and thereby on rotation to heat the lower portion of the mixture.

Signed at Montreal this 20th day of April, 1920.

ALFRED STANSFIELD.